N. CHAPDELAINE.
ROCKING CARRIAGE.
APPLICATION FILED DEC. 9, 1920.

1,404,834.  Patented Jan. 31, 1922.

INVENTOR
N. Chapdelaine
BY Fetherstonhaugh
ATTORNEY

UNITED STATES PATENT OFFICE.

NORBERT CHAPDELAINE, OF MONTREAL, QUEBEC, CANADA, ASSIGNOR TO ALLAN ANGUS MAGEE, OF MONTREAL, QUEBEC, CANADA.

ROCKING CARRIAGE.

1,404,834.  Specification of Letters Patent.  Patented Jan. 31, 1922.

Application filed December 9, 1920. Serial No. 429,528.

*To all whom it may concern:*

Be it known that I, NORBERT CHAPDELAINE, a subject of the King of Great Britain, and residing at 740 Papineau Avenue, in the city and District of Montreal, in the Province of Quebec, in the Dominion of Canada, have invented a new and useful Rocking Carriage, of which the following is the specification.

The invention relates to rocking carriage, as described in the present specification and illustrated in the accompanying drawings that form part of the same.

The invention consists essentially in the novel application of the eccentric principle in wheeling a vehicle, particularly for carrying a young child.

The objects of the invention are to impart a regular and pleasant motion to the body of the vehicle for the greater enjoyment of the child's outing; to contrive by mechanical means an additional movement to the vehicle, that will not require extra muscular effort to produce; to afford healthy children an added zest to the trip, which will enable them to breathe freely; and generally to provide a first class child's carriage of a durable and serviceable character.

In the drawings, Figure 1 is a perspective view of the cart.

Like numerals of reference indicate corresponding parts in each figure.

Figure 1:
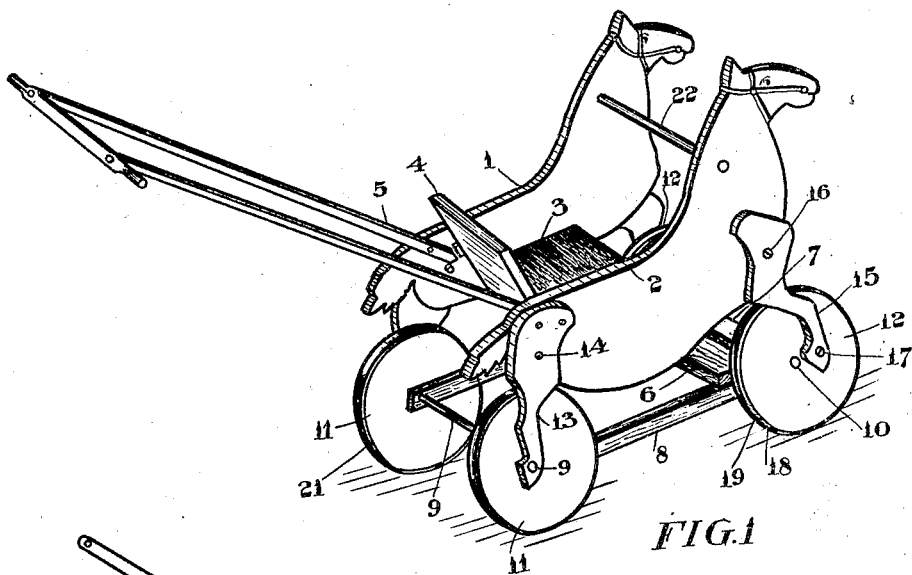
Figure 2:
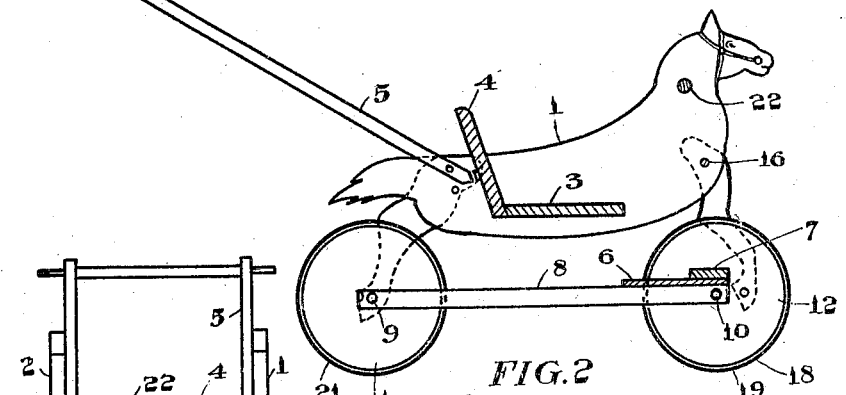
Figure 2 is a longitudinal sectional view through the body and foot rest.
Figure 3:
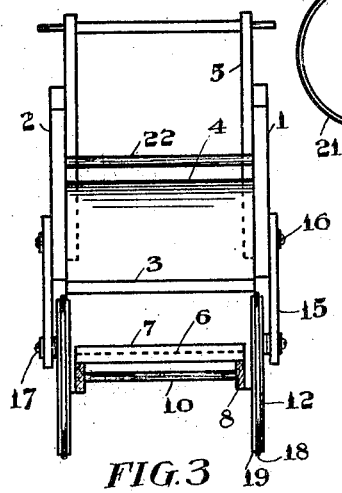
Figure 3 is a front elevation of the carriage.
Figure 4:
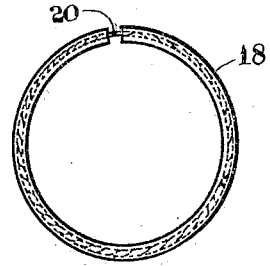
Figure 4 is a detail of a tire.

Referring to the drawings, the sides 1 and 2 of the cart are made in any attractive form such as the outline of a horse or other animal or thing.

These sides 1 and 2 are rigidly secured to the seat 3 and back 4, and the push handle 5 is pivotally attached to the rear ends of the said sides 1 and 2 to the inner walls behind the back 4.

The truck is formed of the foot rest 6 having the additional toe stop 7, said rest 6 being secured to the rails 8, which reach from the rear axle 9 to the front axle 10 and are secured thereto.

The rear wheels 11 are rotatively mounted on the rear axle 9 and the front wheels 12 rotate the axle 10.

The body formed of the sides 1 and 2, seat 3 and back 4, is joined to the truck formed of the foot rest 6, rails 8 and running gear, by the fixed hind legs 13 preferably cut out of a board like the sides 1 and 2, and fixedly secured to said sides by the screws 14 and at their lower ends mounted on the fixed axle 9, and also for the forelegs 15 preferably cut out of a board and at their upper ends pivotally secured to the sides by the pivot pins 16 and to the front wheels 12 by the screw pivots 17, the latter being screwed into the wheels in corresponding radial lines intermediate of the distance between the axle 10 and tire 18.

The tires 18 are mounted in an annular groove 19 in each wheel 9 and are preferably made of lengths of rubber tubing having a piece of twisted wire 20 therethrough to tie them in the bed of the groove and similarly a like tire 21 is stuck into an annular groove in each of the rear wheels 11. The tubular tires are slightly parted at the ends for the natural ingress and egress of air.

The hand rail 22 connects the sides 1 and 2 in front of the seats and in operation the child sits holding the hand rail or is strapped in the seat and the cart is wheeled by the nurse, which has the effect of lifting the body upwardly and dropping it downwardly at each revolution of the front wheels, for the front legs being pivotally secured to the wheels off the centre, the truck keeps on a steady course while the body is constantly rising and falling thereby imparting a pleasant and healthful motion to the vehicle under running conditions.

What I claim is:

1. In a rocking carriage, a body formed of seat and sides, a truck formed of running gear and frame and legs forming supports from the body and so attached to the wheels as to impart a rocking and impelling movement to the carriage in a swinging arcual motion with the rear axle as the centre.

2. In a rocking carriage, a body formed of seat and sides, a truck formed of foot rest and frame supported by front and rear wheels in pairs, hind legs fixedly secured to the sides and mounted on the axle of the rear wheels and forelegs pivotally secured to said sides and to said front wheels off the centre.

3. A rocking carriage comprising a body formed of plates or boards supported and held apart rigidly by a seat and seat back and having rigid hind legs and pivoted fore legs, a truck supporting said body and having front and rear wheels and its central rear axle mounted in said hind legs and its central front axle mounted in the truck, pins pivotally securing said front legs to the front wheels off centre and a foot rest secured to the front end of the truck.

4. A rocking carriage comprising a body having board or plate sides spaced by seat, back and hand rail, longitudinal rails, a foot rest having a toe piece secured to the said rails, running gear mounted in said rails and means securing said running gear to said body adapted to rock the latter in travelling.

Signed at Montreal, Quebec, Canada, this fourth day of December, 1920.

NORBERT CHAPDELAINE.